June 24, 1947. L. J. RUTLEDGE 2,422,930
FOLDING TRAILER BOAT
Filed Jan. 8, 1945 2 Sheets-Sheet 1

Inventor
Leonard J. Rutledge,
By McMorrow & Berman
Attorneys

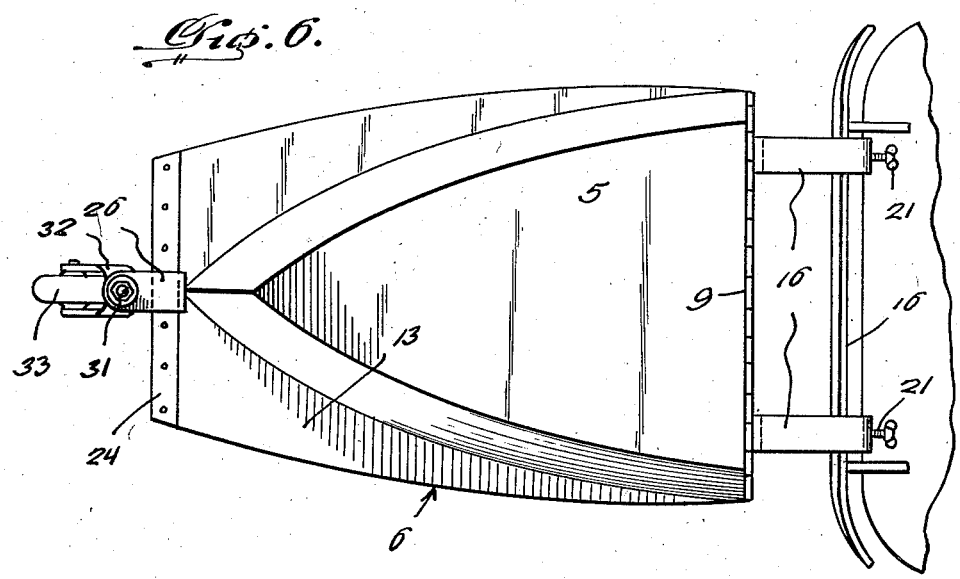
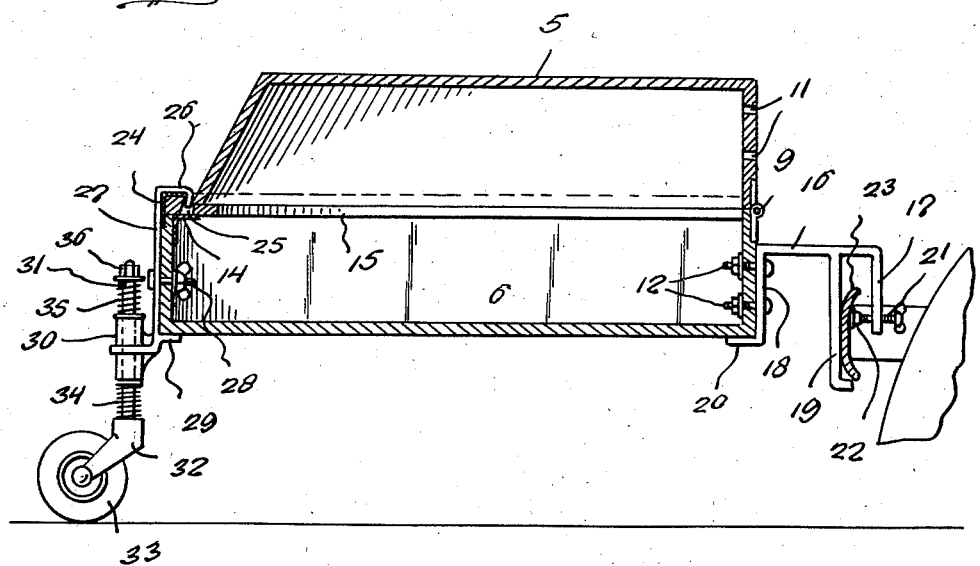

Patented June 24, 1947

2,422,930

UNITED STATES PATENT OFFICE 2,422,930

FOLDING TRAILER BOAT

Leonard J. Rutledge, Jackson, Mich.

Application January 8, 1945, Serial No. 571,773

1 Claim. (Cl. 9—2)

The present invention relates to new and useful improvements in sectional folding boats, and more particularly to a folding boat provided with means for transporting the same behind a vehicle.

More specifically, the invention comprises front and rear boat sections adapted for folding one upon the other and provided with a trailer wheel and a draw bar whereby the folding boat may be pulled behind an automobile or other vehicle.

An important object of the present invention is to provide a foldable trailer boat of this character whereby the boat, in its folded position, provides a substantially water-proof compartment for food, bedding and other camping supplies and equipment.

A further object is to provide a device of this character of simple and practical construction, which is strong and durable, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, and wherein like numerals refer to like parts throughout, and in which:

Figure 6 is a top plan view showing the folded boat equipped for use as a trailer, and Figure 7 is a longitudinal sectional view thereof.

Figure 3:
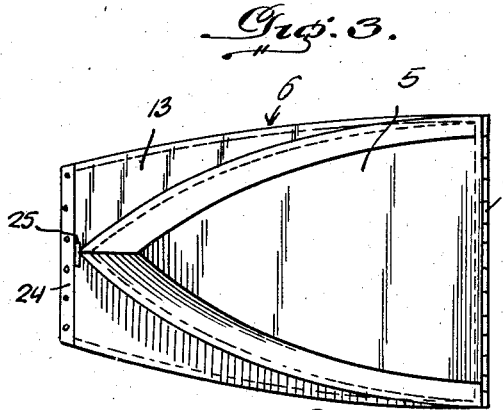
Figure 3 is a top plan view showing the boat in folded position.
Figure 4:
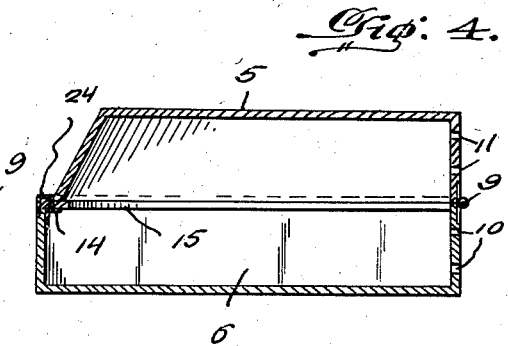
Figure 4 is a longitudinal sectional view thereof.
Figure 5:
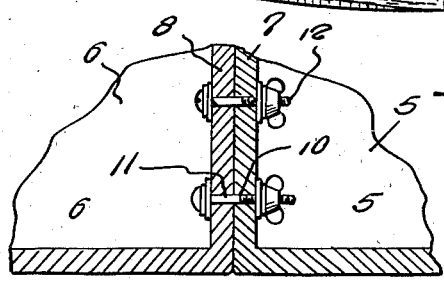
Figure 5 is an enlarged fragmentary sectional view illustrating the bolts for securing the sections of the boat together.

Referring now to the drawings in detail, wherein for the purpose of illustration I have disclosed a preferred embodiment of the invention, the numerals 5 and 6 designate the front and rear sections of a row boat, the adjacent ends of the sections having transverse walls 7 and 8, respectively, hingedly connected to each other at their upper edges by a conventional form of hinge structure 9, whereby the front section 5 may be folded on top of the rear section 6 in a manner as illustrated in Figure 3 and Figure 4 of the drawings.

The connected walls 7 and 8 of the front and rear sections are formed with aligned openings 10 and 11 adapted to receive bolts 12 for securing the sections in open position, whereby to rigidly connect the sections together for use in its normal manner.

Figure 1:
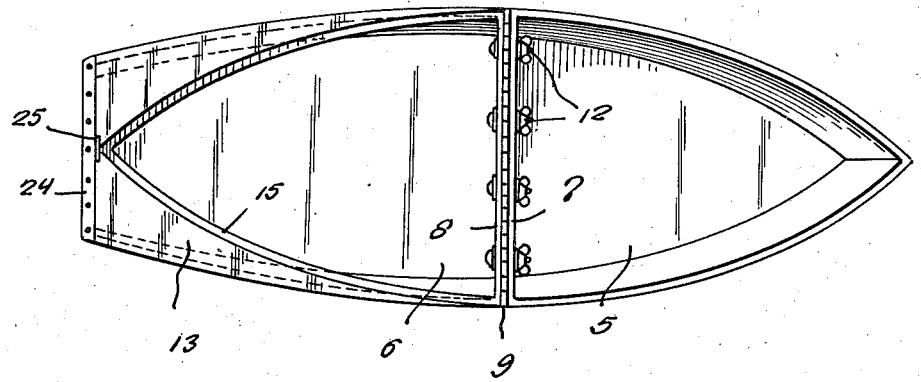
Figure 1 is a top plan view of the boat in its open position.
Figure 2:
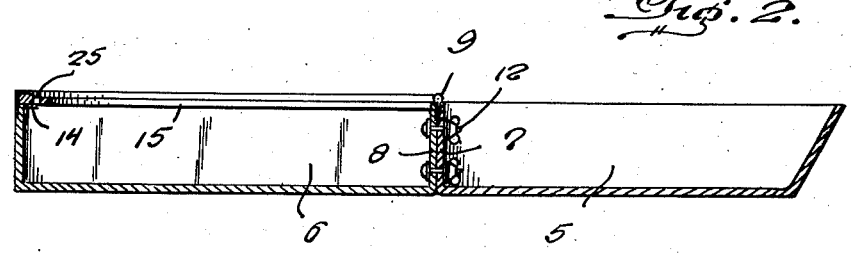
Figure 2 is a longitudinal sectional view thereof.

The stern portion of the rear section 6 is formed with a decking 13 which extends across the stern of the boat and along the side edges thereof, the decking converging toward the sides of the boat in a forward direction, as will be apparent from an inspection of Figure 1 of the drawings. The decking 13 is supported by an angle iron brace 14 secured to the stern and sides of the rear section 6 adjacent the gunwale thereof, and the inner edge of the decking 13 is formed with a shoulder 15 below the plane of the decking and shaped to conformably receive the edges of the front section 5, when the latter is in its folded position upon the rear section 6, the edges of the folded section 5 thus being recessed below the surface of the decking 13 whereby to provide a substantially water-tight fit around the edges of the folded sections of the boat.

When the sections are in their folded position, the bolts 12 are adapted for attaching tow poles 16 thereto, the tow poles being in the form of brackets of substantially inverted U-shaped construction and including downwardly extending front legs 17, downwardly extending rear legs 18 and downwardly extending intermediate legs 19. The rear leg 18 is formed at its lower end with a rearwardly extending flange 20 underlying the bottom of the rear section 6 of the boat, to cooperate in the support of the front end thereof.

The front leg 17 of the bracket is provided with a screw 21 having a clamping head 22 thereon and adapted for clamping the rear bumper 23 of an automobile or other vehicle against the intermediate leg 19 of the bracket, as shown to advantage in Figure 7 of the drawings.

Any desired number of these tow pole brackets may be employed to provide a suitable rigid connection between the boat and the towing vehicle.

The stern of the rear section 6, at its upper edge, is provided with a reinforcing strip 24 constituting an elevated ledge and a central portion of the decking 13 adjacent the strip 24 is formed with a slot 25 adapted to receive a hook 26 on the upper end of a bracket 27 secured vertically against the stern of the boat by means of a bolt 28.

The lower portion of the bracket 27 is formed with an inwardly extending flange 29 underlying the bottom of the boat and also formed with the bottom of the bracket 27 is a vertically extending sleeve bearing 30 having a vertical pin 31 rotatably and slidably mounted in the bearing, the lower end of the pin being formed with a trailing yoke 32 on which a wheel 33 is journaled.

A lower coil spring 34 is mounted on the pin between the yoke 32 and the bearing 30 and an upper coil spring 35 is mounted on the pin between the bearing and a nut and washer 36 on the upper end of the pin, the springs 34 and 35 providing a yieldable mounting for the wheel, to eliminate shock which might be subjected to the boat when traveling over rough ground.

When the sections of the boat are arranged in folded position, it will be apparent that a substantially waterproof compartment is formed within which the food, bedding and other camping and fishing equipment may be stored, and by attaching the trailer bracket 27 on the rear of the section 6 and attaching the bracket 16 on the front end thereof, the folded sections of the boat may thus be used as a trailer.

It is believed the details of construction, operation and advantages of the device will be readily understood from the foregoing without further detailed information.

I claim:

In a trailer boat comprising front and rear sections hinged together, said front section being foldable over the rear section, said rear section having decking and a reinforcing strip constituting an elevated ledge secured to the upper edge of its stern on said decking, said decking having a slot in its middle portion in juxtaposed position relative to said strip, a bracket detachably secured to the stern of the rear section on the outside thereof and including a substantially vertically extending sleeve bearing, a pin rotatably and slidably mounted in said bearing, coil springs mounted on said pin above and below the bearing to yieldably cushion the pin relative to the bearing, a wheel journalled in a trailing caster yoke on the lower end of said pin, means to retain the upper spring on the pin, said bracket having a portion constituting an upright bar, said bar having a hook on its upper end hooking over the elevated ledge and engaging in the slot of the decking, said bar having on its lower portion a flange engaging the bottom of the boat in opposed relation to the hook, in combination with a detachable bolt securing said bar to the stern of the boat.

LEONARD J. RUTLEDGE.

REFERENCES CITED

The following references are of record in the file of this patent:

UNITED STATES PATENTS

| Number | Name | Date |
|---|---|---|
| 1,560,983 | Gibbs et al. | Nov. 10, 1925 |
| 2,157,186 | Pinter et al. | May 9, 1939 |
| 2,287,055 | Olson | June 23, 1942 |
| 2,027,852 | Allan | Jan. 14, 1936 |

FOREIGN PATENTS

| Number | Country | Date |
|---|---|---|
| 30,181 | Australia | Oct. 22, 1931 |